United States Patent

[11] 3,591,313

[72] Inventor Alfred Wunsch
 Wettingen, Switzerland
[21] Appl. No. 830,459
[22] Filed June 4, 1969
[45] Patented July 6, 1971
[73] Assignee Aktiengesellschaft Brown, Boveri & Cie
 Baden, Switzerland
[32] Priority June 20, 1968
[33] Switzerland
[31] 9203-68

[54] PRESSURE WAVE MACHINE
 6 Claims, 1 Drawing Fig.
[52] U.S. Cl. ................................................. 417/64
[51] Int. Cl. ............................................ F04b 37/02
[50] Field of Search ........................................... 230/69, 69
 P; 60/39, 45; 416/241; 415/200, 212; 417/64

[56] References Cited
UNITED STATES PATENTS
2,783,967 3/1957 Scharf et al. ................ 416/241
3,148,954 9/1964 Haas .............................. 416/241 X
3,291,379 12/1966 Herger et al. ................. 230/69 (P)

Primary Examiner—Robert M. Walker
Attorney—Pierce, Sheffler & Parker

ABSTRACT: A pressure wave machine includes a celled rotor through which a hot gaseous medium and air are passed to establish an exchange of energy. The housing structure for the machine includes a central part surrounding the rotor and side parts located adjacent the opposite ends of the rotor which serve for the introduction of the hot gaseous medium and air respectively into the cells. In order to maintain an at least approximately constant length of the rotor and central part of the housing structure, and an at least approximately constant clearance gap between the ends of the rotor and the adjacent side parts of the housing structure under all operating conditions and regardless of the temperature of the hot gaseous medium, the rotor and central part of the housing structure are made from a metallic material having a very low means coefficient of thermal expansion. Suitable metallic materials are nickel-iron alloys and nickel-iron-cobalt alloys. The surface of the rotor may also be coated with a material, such as an enamel, having a poor heat conductivity characteristic to retard its heat absorption.

PATENTED JUL 6 1971　　　　　　　　　　　　　　　　　　3,591,313
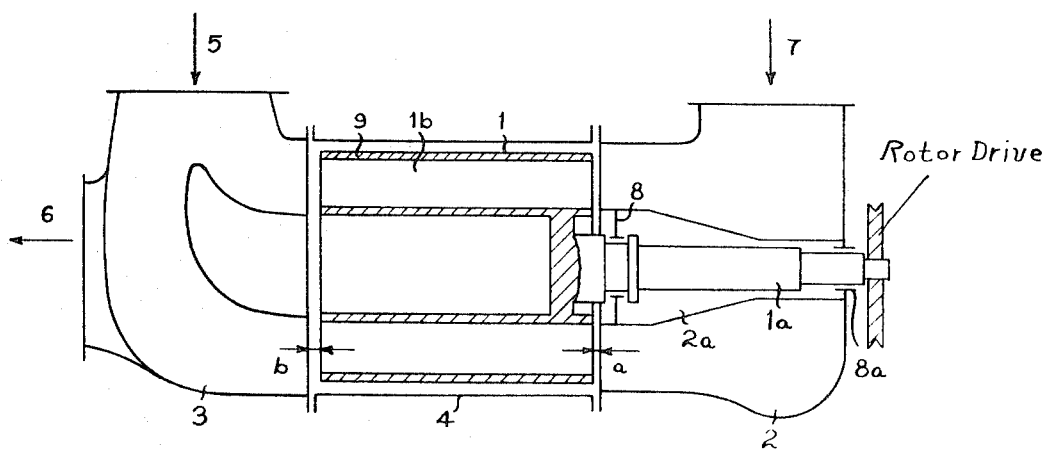
INVENTOR.
Alfred Wunsch
BY
Pierre Scheffler & Parker
Attorneys

PRESSURE WAVE MACHINE

The present invention relates to an improvement in a pressure wave machine for gaseous media, in which the rotor, consisting at least of shaft, hub, cell walls and cover band, moves in a stationary housing assembled from center part and side parts, the machine being of the general type as disclosed in U.S. Pat. No. 3,291,379 granted Dec. 13, 1966.

For perfect functioning of a pressure wave machine and to obtain good efficiency it is necessary to limit the leakage losses at the faces of the rotor to a minimum, i.e. to maintain a very small axial clearance between the rotor and the side parts of the housing. To achieve this goal it is known to absorb the heat expansions of the rotor and the central housing part inward by dividing the rotor so that the cell walls can shift axially with respect to each other, and by inserting a wave-shaped compensating piece into the center part. But from an engineering standpoint, these designs are complicated and, therefore, expensive, and as to their strength, various problems can appear.

The invention is based on the problem of achieving the same effect in a more simple manner and avoiding the disadvantages of the known design. The solution of the problem posed consists in that, for the maintenance of an approximately constant length of the rotor and the central housing part, and for the maintenance of an approximately constant axial gap between the rotor and the side parts of the housing under all operating conditions and regardless of the temperature of the media, the rotor and the central housing part are made from an alloy with a very small mean heat expansion coefficient.

The invention will be explained in greater detail by way of the accompanying drawing which shows schematically, in an axial section, the usual construction of a pressure wave machine such as used, for example, for charging diesel engines.

With reference now to the drawing, the celled rotor 1 revolves in a stator which consists of the air housing 2, the gas housing 3 and the central housing part. 4. The cell portion of the rotor is located within the central housing part 4, and the rotor structure is supported for rotation at one end only, the rotor shaft 1a projecting from such end being carried by axially spaced bearings 8, 8a within the internal part 2a of housing 2. The energy-rich gas enters the gas housing 3 at inlet 5, imparts a part of its energy to the air as it passes through the cells 1b in the rotor 1 and discharges axially at outlet 6. The air enters the air housing 2 at inlet 7, is compressed as it passes through the cells in the rotor 1 and discharges at a location (not shown in the drawing) from the air housing in a direction perpendicular to the drawing plane. In this process it is unavoidable that leakage—gas or air—flows through the gaps between the end faces of the rotor and the adjacent side parts of the housing.

The gap a between one end of rotor 1 and the air housing 2 can be kept very small because the thrust bearing 8 is located close to the rotor and differences in expansion which occur are insignificant. The situation is much more difficult on the gas side 3 where the expansions of the hot cell walls have their full effect. The gap b is between the other end of rotor 1 and the gas housing 3 determined by the expansion difference between the rotor 1 and the central housing part 4. When the hot gas flows through the cells 1b upon starting the pressure wave machine, the rotor expands towards the gas housing 3 in accordance with the temperature and the coefficient of heat expansion of its material. The gap b becomes smaller because the central housing part 4 cannot follow so quickly, as it is heated mainly by the leakage. After a certain period of time the gap b reaches its smallest value, which is governing for the assembly clearance of the cold machine, for the rotor surface must under no circumstances and under no operating conditions swipe the surface of the housing. Unfortunately, the gap b does not remain at its smallest value, but becomes larger again because the central housing part heats up again so that the gap may even become larger than it was in the cold condition of the machine.

In accordance with the invention, i.e., to avoid the great and, above all, variable heat expansion differences, the rotor and central housing part are produced from an alloy with a very small mean coefficient of heat expansion. It should, in a temperature range between 0 and 350° C. be below $8 \cdot 10^{16}$. Suitable materials are primarily the commercial nickel-iron alloys with controlled expansion behavior which contain between 36 and 54 percent nickel. Also suited for the purpose with respect to their heat expansion behavior are the known nickel-cobalt-iron alloys. An excellent material would be quartz, but manufacturing difficulties are a hurdle for its practical application.

The low coefficients of heat expansions of the said alloys, however, occur only in a limited temperature range which is the wider the higher the nickel content. Above a critical temperature, the expansion values increase very greatly, approximately to the value of carbon steel. In spite of this, these materials can be employed to advantage for pressure wave machines because, due to the rotor being charged alternately with hot and cold gases, its mean temperature is much lower than the temperature of the hot gases. Particularly upon starting, it runs through the low-temperature ranges, for which reason full use can be made just then of the alloys with a small coefficient of heat expansion.

This property of the alloys can be utilized even further, particularly when the rotor must work in a higher temperature range, in that the rotor's heat absorption is retarded. A simple means to accomplish this is by coating the rotor with a material having a poor heat conductivity, such as is known, of glass or ceramic. Suitable as a heat-insulating coating 9 are primarily enamel films which can be applied very thinly. While their insulating effect is then poorer, it still suffices, in cooperation with the nickel alloy, to give the central housing part sufficient time to heat up, for the heat expansion of the rotor is decreased not only by its lower temperature, but also by the coefficient of heat expansion being lower at the lower temperatures.

Traditionally, the central housing part is provided with no coating, for, as the colder component, it should be able to absorb heat unhindered. But it is possible to influence its expansion behavior by covering it partly with an insulating coating. The rotor's cover band, too, remains uncoated on its outside in order not to render heat radiation to the surrounding housing more difficult.

Due to the but small change in the length of the rotor and of the central housing part, the change in the gap width between the rotor and the gas housing becomes less also. Consequently, the gap can be made smaller right from the beginning and, hence it is relatively small even in its stationary operating condition. The leakage losses become smaller and the efficiency increases.

When using the pressure wave machine to charge diesel engines, it is possible to enlarge the engine's operating range considerably because, due to the smaller leakage losses, the achievable compression ratio of the air, particularly in the area of slower speeds, is substantially increased, which can amount to as much as 10.

I claim:

1. In a pressure-wave machine which includes a rotor provided with a system of cells extending longitudinally of the rotor for receiving a hot gaseous medium at one end of the rotor and air at the other end of the rotor, a stationary housing structure, said housing structure including a central portion surrounding said rotor and side portions located respectively adjacent the ends of said rotor and spaced therefrom by a clearance gap, said side portions of said housing structure serving respectively for the introduction of said hot gaseous medium and air into the cells on said rotor, the improvement wherein for maintaining an at least approximately constant length of said rotor and central portion of said housing structure and for maintaining an at least approximately constant clearance gap between the ends of said rotor and said side portions of said housing structure under all operating conditions and regardless of the temperature of said gaseous medium, the entire rotor and cell system thereof and also the central portion of said housing structure are made from a metallic material having a very low mean coefficient of thermal expansion.

2. A pressure-wave machine as defined in claim 1 wherein the metallic material from which said rotor and central portion of said housing structure are made is constituted by a nickel-iron alloy containing from 36 percent to 54 percent nickel.

8. A pressure-wave machine as defined in claim 1 wherein the metallic material from which said rotor and central portion of said housing structure are made is constituted by a nickel-cobalt-iron alloy.

4. A pressure-wave machine as defined in claim 1 wherein said rotor is provided with means for retarding its heat absorption.

5. A pressure-wave machine as defined in claim 1 wherein surfaces of said rotor are provided with a coating of a material having a poor heat conductivity characteristic thereby to retard its heat absorption.

6. A pressure-wave machine as defined in claim 5 wherein said coating material consists of an enamel.